US012741289B2

(12) United States Patent
Beywl et al.

(10) Patent No.: US 12,741,289 B2
(45) Date of Patent: Sep. 22, 2026

(54) TRANSVERSE DISC OF A CENTRIFUGE SCREW, AND SOLID-BOWL SCREW CENTRIFUGE

(71) Applicant: FLOTTWEG SE, Vilsbiburg (DE)

(72) Inventors: Michael Beywl, Bodenkirchen (DE); Thomas Hasenecker, Eberspoint (DE); Lothar Fränkel, Gerzen (DE)

(73) Assignee: FLOTTWEG SE, Vilsbiburg (DE)

( * ) Notice: Subject to any disclaimer, the term of this patent is extended or adjusted under 35 U.S.C. 154(b) by 886 days.

(21) Appl. No.: 17/780,167

(22) PCT Filed: Dec. 17, 2020

(86) PCT No.: PCT/EP2020/086626

§ 371 (c)(1),
(2) Date: May 26, 2022

(87) PCT Pub. No.: WO2021/122884

PCT Pub. Date: Jun. 24, 2021

(65) Prior Publication Data

US 2022/0410176 A1 Dec. 29, 2022

(30) Foreign Application Priority Data

Dec. 19, 2019 (DE) ..................... 10 2019 135 215.0

(51) Int. Cl.
*B04B 1/20* (2006.01)

(52) U.S. Cl.
CPC ........ *B04B 1/20* (2013.01); *B04B 2001/2041* (2013.01); *B04B 2001/2058* (2013.01)

(58) Field of Classification Search
CPC .............. B04B 1/20; B04B 2001/2041; B04B 2001/2058

(Continued)

(56) References Cited

U.S. PATENT DOCUMENTS 2,633,930 A * 4/1953 Carter ....................... B07B 7/08 209/714
6,508,752 B1 * 1/2003 Hallgren ................... B04B 1/08 494/84

(Continued)

FOREIGN PATENT DOCUMENTS

CA 2932188 A1 12/2017 ............... B04B 7/08
CN 1938099 A 3/2007 ............... B04B 1/20

(Continued)

OTHER PUBLICATIONS

An Office Action (in Chinese) and an English translation thereof, dated Jan. 20, 2024, issued by the China National Intellectual Property Administration for Applicant's related Chinese Patent Application No. CN202080088302.2.

(Continued)

*Primary Examiner* — Claire X Wang
*Assistant Examiner* — Shuyi S. Liu
(74) *Attorney, Agent, or Firm* — Bodner & Bodner, PLLC; Christian P. Bodner; Gerald T. Bodner

(57) ABSTRACT

The invention relates to a transverse disc (60) of a centrifuge screw (30) for stabilising a screw hub structure. According to the invention, at least one opening (70) is formed at least in some sections on at least 75% of all the imaginary circle lines (71) of the transverse disc (60) between the centre point (M) and the transverse disc circumference (72).

9 Claims, 2 Drawing Sheets

Figure 1:
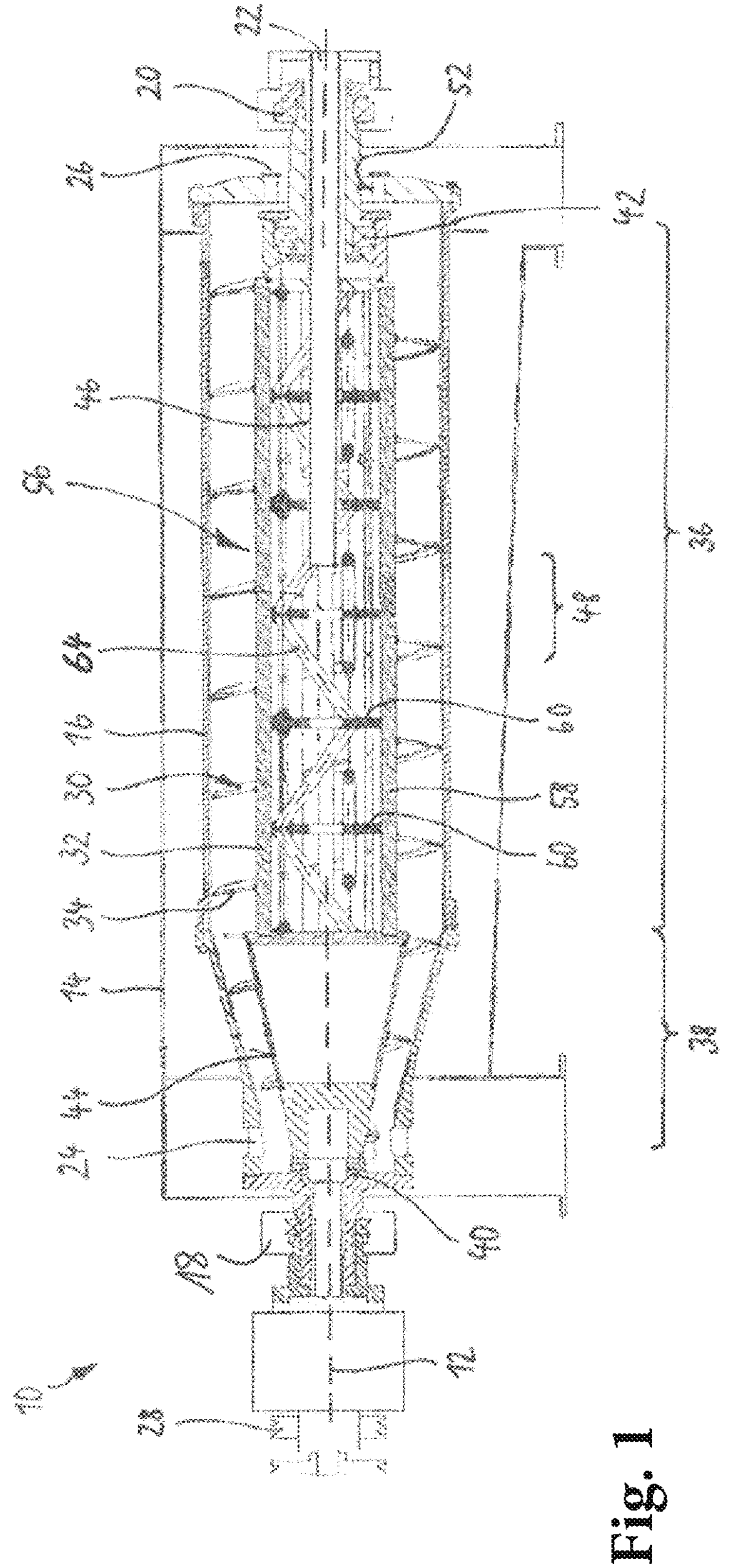

(58) Field of Classification Search
USPC ............................................................ 494/66
See application file for complete search history.

(56) References Cited

U.S. PATENT DOCUMENTS

| | | | | |
|---|---|---|---|---|
| 7,753,834 | B2 | 7/2010 | Figgener et al. | 494/53 |
| 10,583,443 | B2 | 3/2020 | Bauer et al. | |
| 10,882,058 | B2 | 1/2021 | Aagaard et al. | |
| 12,528,092 | B2 | 1/2026 | Ebert et al. | |
| 2018/0178223 | A1* | 6/2018 | Bauer | B04B 1/20 |
| 2022/0401965 | A1 | 12/2022 | Bauer et al. | |
| 2023/0001429 | A1 | 1/2023 | Beywl et al. | |
| 2023/0398556 | A1 | 12/2023 | Hiermer et al. | |
| 2023/0405605 | A1 | 12/2023 | Vielhuber et al. | |
| 2023/0405606 | A1 | 12/2023 | Beywl | |

FOREIGN PATENT DOCUMENTS

| | | | | |
|---|---|---|---|---|
| CN | 102802803 | | 11/2012 | B04B 1/20 |
| CN | 204261576 | U | 4/2015 | B01F 5/06 |
| CN | 106413907 | A | 2/2017 | B04B 1/20 |
| CN | 106794473 | | 5/2017 | B04B 1/20 |
| CN | 106794473 | A | 5/2017 | B04B 1/20 |
| DE | 575314 | C | 4/1933 | B04B 1/20 |
| DE | 2832922 | A1 | 2/1980 | B02C 18/36 |
| DE | 3802333 | A1 | 8/1989 | B04B 1/20 |
| DE | 102014111104 | A1 | 2/2016 | B04B 1/20 |
| EP | 3398686 | A1 * | 11/2018 | B04B 1/08 |
| KR | 101943944 | B1 * | 1/2019 | B04B 1/08 |
| SU | 1386299 | A1 | 4/1988 | B02C 18/30 |
| WO | WO2016019944 | A1 | 2/2016 | B04B 1/20 |

OTHER PUBLICATIONS

An Office Action (in Chinese) and an English translation thereof, dated Jul. 24, 2024, issued by the China National Intellectual Property Administration for Applicant's related Chinese Patent Application No. CN202080088302.2.

An Office Action (in Hindi and English), dated Nov. 17, 2022, issued by the Indian Patent Office for Applicant's related Indian Patent Application No. IN202217034349, filed Jun. 15, 2022.

The Notification Concerning Transmittal of International Preliminary Report on Patentability (Chapter I of the Patent Cooperation Treaty), in English, dated Jun. 30, 2022, which was issued by the International Bureau of WIPO in Applicant's corresponding international PCT application having Serial No. PCT/EP2020/086626, filed on Dec. 17, 2020.

The English translation of the International Preliminary Report on Patentability (Chapter I of the Patent Cooperation Treaty), dated May 17, 2022, which was issued by the International Bureau of WIPO in Applicant's corresponding international PCT application having Serial No. PCT/EP2020/086626, filed on Dec. 17, 2020.

The Written Opinion of the International Searching Authority, in English, dated Mar. 12, 2021, which was issued by the International Bureau of WIPO in Applicant's corresponding international PCT application having Serial No. PCT/EP2020/086626, filed on Dec. 17, 2020.

The International Search Report, in English, dated Mar. 12, 2021, which was issued by the International Bureau of WIPO in Applicant's corresponding international PCT application having Serial No. PCT/EP2020/086626, filed on Dec. 17, 2020.

An Office Action (in German), dated Nov. 5, 2020, issued by the German Patent Office for Applicant's corresponding German Patent Application No. DE102019135215.0, filed Dec. 19, 2019.

An Office Action (in Chinese) and a computer-generated English translation thereof, dated Jan. 23, 2024, issued by the Chinese Patent Office for Applicant's Chinese Patent Application No. 202080088122.4, filed on Dec. 17, 2020, which relates to Applicant's corresponding U.S. Appl. No. 17/776,461, filed May 12, 2022.

An Office Action (in Chinese) and a computer-generated English translation thereof, dated Jan. 29, 2024, issued by the Chinese Patent Office for Applicant's Chinese Patent Application No. 202080088300.3, filed on Dec. 17, 2020, which relates to Applicant's corresponding U.S. Appl. No. 17/781,762, filed Jun. 2, 2022.

A Second Office Action (in Chinese) and a computer-generated English translation thereof, dated Jul. 24, 2024, issued by the Chinese Patent Office for Applicant's Chinese Patent Application No. 202080088122.4, filed on Dec. 17, 2020, which relates to Applicant's corresponding U.S. Appl. No. 17/776,461, filed May 12, 2022.

An Office Action (in Chinese) and a computer-generated English translation thereof, dated Sep. 27, 2025, issued by the Chinese Patent Office for Applicant's Chinese Patent Application No. 202180089998.5, filed on Nov. 9, 2021, which relates to Applicant's corresponding U.S. Appl. No. 18/035,638, filed May 5, 2023.

Applicant's related U.S. Appl. No. 17/776,461, filed May 12, 2022, and titled "Inlet Region of a Centrifuge Screw, and Solid Bowl Centrifuge", and having U.S. Patent Application Publication No. 2022/0401965.

Applicant's related U.S. Appl. No. 17/781,762, filed Jun. 2, 2022, and titled "Screw Hub, Centrifuge Screw and Solid Bowl Screw Centrifuge", and having U.S. Patent Application Publication No. 2023/0001429.

Applicant's related U.S. Appl. No. 18/035,440, filed May 4, 2023, and titled "Screw Hub, Centrifugal Screw, and Solid Bowl Screw Centrifuge", and having U.S. Patent Application Publication No. 2023/0405605.

Applicant's related U.S. Appl. No. 18/035,618, filed May 5, 2023, and titled "Centrifugal Screw, and Solid Bowl Screw Centrifuge", and having U.S. Patent Application Publication No. 2023/0405606.

Applicant's related U.S. Appl. No. 18/035,638, filed May 5, 2023, and titled "Centrifugal Screw, and Solid Bowl Screw Centrifuge", and having U.S. Patent Application Publication No. 2023/0398556.

Applicant's related U.S. Appl. No. 19/099,950, filed Jan. 30, 2025, and titled "Screw Hub, Centrifugal Screw, and Solid Bowl Screw Centrifuge" (not published yet).

* cited by examiner

TRANSVERSE DISC OF A CENTRIFUGE SCREW, AND SOLID-BOWL SCREW CENTRIFUGE

The invention relates to a transverse disc of a centrifuge screw for stabilizing a screw hub structure, according to claim 1. Furthermore, the invention relates to a solid bowl screw centrifuge having a centrifuge screw comprising, preferably in at least some sections, comprising a screw hub created of longitudinal bars, according to claim 9.

Solid bowl screw centrifuges are characterized by a drum having a closed or solid bowl. The drum is rotated at high rotational speed, whereby a multiphase mixture located within the drum can be separated into at least a heavy phase and a light phase. Usually, the heavy phase is a solid phase, which is conveyed out from the drum by means of a screw, i.e., a centrifuge screw. For this purpose, the screw is mounted within the drum to be rotational relative to the drum, and has a screw spiral coil. The screw spiral coil is arranged around a screw hub.

The screw spiral coil strikes along the inner side or the inner bowl surface of the drum, and thus conveys the product of the heavy phase to an axial end region of the drum. At the end of the drum, the product of the heavy phase is conveyed out from a discharging cone, for example. The multiphase mixture to be clarified thus is located between the inner side of the drum and the screw hub.

In certain solid bowl screw centrifuges, a large pond depth is aspired, in particular for clarification technological reasons. At the same time, however, the pond depth is restricted by the diameter of the screw hub and resulting buoyancy and deposition effects there of the mixture to be clarified or of the light phase.

The diameter of the screw hub cannot be reduced in an unlimited manner, since the rigidity and stability of the centrifuge screw depends on the diameter of the screw hub.

It is known from the state of the art to form screw hubs such as to be reduced with respect to the screw hub wall. Between single screw hub walls, recesses may thus be formed.

However, it is necessary to form such screw hub structures with corresponding transverse discs so that the screw hub will be stabilized.

Based on the existing state of the art, the task of the present invention is to propose a transverse disc of a centrifuge for stabilizing a screw hub structure, which, on the one hand, sufficiently stabilizes the screw hub structure and, on the other hand, is formed such that liquid, i.e., the centrate within the solid bowl screw centrifuge, can flow off in an unimpeded manner. The transverse disc is to be formed such that the rigidity of the transverse disc is not affected.

Furthermore, it is the task of the present invention to propose a further developed solid bowl screw centrifuge, which is in particular further developed with respect to the transverse disc.

This task is solved with respect to the transverse disc by the subject matter of claim 1, and with respect to the solid bowl screw centrifuge by the subject matter of claim 9. The subclaims comprise at least appropriate configurations and further developments.

According to the invention, a transverse disc of a centrifuge screw for stabilizing a screw hub structure is taken as a basis, wherein at least one opening is formed at least in some sections on at least 75% of all the imaginary circle lines of the transverse disc between the center point and the transverse disc circumference. The imaginary circle lines are all of the circle lines that can be formed in the radial extension between the center point and the transverse disc circumference.

Preferably, only a distance of 5 mm, in particular of 2 mm, in particular of 1 mm, in particular of 0.5 mm between the circle lines is formed in the theoretical or imaginary formation. In such an observation of the circle lines, the distance between the circle lines preferably is formed to be of equal size.

As a transverse disc of a centrifuge screw, such a disc is to be understood, which is formed transversely to the longitudinal axis of the screw hub. The transverse disc serves in particular for stabilizing such a screw hub structure, which is based, for example, on a structure of several longitudinal bars. A transverse disc may also be designated as a support disc.

Based on the center point in the direction of the disc circumference, the transverse disc has imaginary circle lines. An opening or a section of an opening is formed at least in some sections on at least 75% of all of the imaginary circle lines.

In other words, in at least 75% of the entire diameter area of the transverse disc, at least one opening or at least one partial section of an opening is formed at least in some sections across the respective diameter. In other words, on at least 75% of all of the diameters of the transverse disc, at least one opening or at least one partial section of an opening is formed in at least some sections across the respective diameter.

Such a formation of openings across a large part of the diameter area of the transverse disc enables the liquid or the centrate within the area of the screw hub structure to flow off well. At the same time, such a transverse disc has sufficient rigidity so that the transverse disc continues to cause the screw hub structure to be well stabilized.

In an embodiment of the invention, in particular a diameter area of the transverse disc delimiting a central middle opening can be formed without opening(s). Such a section free from openings can serve for additionally stabilizing the transverse disc.

In a particularly preferred embodiment of the invention, an opening or a section of an opening is formed on all imaginary circle lines of the transverse disc at least in some sections. In other words, across the entire diameter area of the transverse disc, at least one opening or at least one partial section of an opening is formed with respect to each diameter in a particularly preferred manner.

It is possible for the transverse disc to be constructed such that across the entire diameter area of the transverse disc, the liquid or the centrate is enabled to flow off.

Preferably, the openings of the transverse disc are formed such that these openings have different geometries and/or opening sizes and/or arrangement patterns.

As the geometry of an opening, the shape of the opening is to be understood. It is possible for the transverse disc to have several openings having different geometries.

The opening size of an opening concerns in other words the opening surface. Through the opening size, the liquid can flow through and/or off. It is possible for the openings to have different dimensions with respect to the opening sizes.

As the arrangement pattern, the arrangement of several openings is to be understood, wherein at least two openings create a group of openings, wherein several groups of openings can be arranged to be distributed over the transverse disc. Furthermore, it is possible for the transverse disc to have a group of openings, which create several openings evenly distributed across the transverse disc. Preferably, a group of openings is created by several identically formed openings. As identical openings, openings are to be understood, which have the same geometry and the same cross-sectional surface.

In an embodiment of the invention, the transverse disc has several openings formed in a cam-shape or an oval-shape or elliptically. Preferably, such openings are arranged in pairs. A pair of such openings thus creates a group of openings. Several of such groups of openings, however, can be evenly be distributed across the transverse disc.

As a cam-shaped opening, such an opening is to be understood which substantially has the shape, in particular the cross-sectional shape, of a cam of a camshaft. Such an opening has in particular the shape of a steep cam. In other words, such an opening is created by two circle segments, the central radius points of which are on a common mirror axis of the opening. The circle segments are in turn connected to one another in some sections by straight lines.

It is furthermore possible for the openings to be formed in an oval-shape or elliptically. In a particularly preferred embodiment of the invention, two such openings are respectively arranged relative to one another such that they create a group of openings.

In a particularly preferred embodiment of the invention, six openings are respectively formed in a cam-shape or oval-shape or elliptically, wherein two openings respectively create a group of openings. The three groups of openings thus created are evenly distributed on the transverse disc in the circumferential direction.

The transverse disc according to the invention furthermore can have several openings based on the transverse disc circumference, which are formed as recesses of the transverse disc circumference.

These recesses preferably are formed in a U-shape.

Preferably, such recesses, in particular U-shaped recesses are in turn arranged in pairs. In a particularly preferred embodiment, the transverse disc has six of such recesses, in particular six of U-shaped recesses of this kind. Two of the recesses create a group of openings. The three groups of openings thus formed are evenly arranged on the transverse disc in the circumferential direction. In the circumferential direction, preferably one group of openings formed of U-shaped recesses respectively alternates with a group of openings formed of cam-shaped recesses.

Preferably, the U-shaped recesses have such a length in the direction of the center point of the transverse disc that in the radial extension from the center point to the transverse disc circumference the U-shaped recesses are located at least in some sections on consistent circle lines to the openings formed in a cam-shape.

In a further embodiment of the invention, the transverse disc has several openings formed to be circular.

The openings formed to be circular preferably are arranged in pairs. In other words, two circular openings create a group of openings.

Again preferably, six circularly formed openings are formed. Six of such openings can create three groups of openings having circular forms. The groups of openings in turn are evenly arranged on the transverse disc in the circumferential direction.

It is furthermore possible for circularly formed openings to be arranged as single openings, i.e., not as groups of openings. It is moreover possible for the transverse disc to have different embodiments of circularly formed openings. For example, a first kind of circularly formed openings can be arranged as groups of openings. A second kind of circularly formed openings can respectively be arranged as a single opening.

In a further preferred embodiment of the invention, a group of openings of circular openings and a group of openings created of U-shaped recesses each are formed in an identical circle segment. The group of openings having circular openings is formed internally in this case, i.e., internally in the direction of the center point.

In a preferred embodiment of the invention, the transverse disc is created of six circle segments, wherein three circle segments each have the groups of openings having cam-shaped openings, and three circle segments each have respectively one group of openings created of U-shaped recesses and one group of openings created of circular openings. The thus formed circle segments each are formed alternatingly.

At the transverse disc circumference, preferably substantially semicircular recesses can be formed, which are arranged evenly distributed. The in particular semicircular recesses serve for receiving longitudinal bars creating substantially the screw hub structure.

In other words, the transverse disc preferably has such a number of preferably substantially semicircular recesses at the transverse disc circumference corresponding to the number of longitudinal bars, which in turn create a screw hub of a solid bowl screw centrifuge.

In an embodiment of the invention, twelve of such semicircular recesses can be formed.

It is furthermore possible for the transverse disc to have such a number of recesses at the transverse disc circumference corresponding to the number of longitudinal bars, which create the screw hub.

The number of the preferably substantially semicircular recesses may be higher than the number of longitudinal bars. Accordingly, a transverse disc may be provided, which can serve as a transverse disc of several differently formed screw hubs. In other words, it is accordingly not necessary for the transverse disc to have only such a number of preferably semicircular recesses, which corresponds to the number of longitudinal bars. Rather it is possible for single recesses, for example, each second semicircular recess to be formed as an additional liquid passage.

In the center point of the transverse disc, an opening may be moreover formed. The center point opening may have a circular form having additionally further circle segment-like recesses, in particular three circle segment-like recesses. As a circle segment-like recess such a recess is to be understood, which is created by one circle segment, wherein the circle segment is the partial surface of a circular surface delimited by a circular arc and a circular chord.

Preferably, the circle segment-like recesses, in particular the three of the circle segment-like recesses are evenly formed in the circumferential direction around the circular form of the center point opening created in such a manner.

In a further embodiment of the invention, it is possible for the circle segment-like recesses, in particular the three of the circle-segment-like recesses to be arranged within the transverse disc in such a manner that in the circumferential direction, in each case one group of openings created of two circularly formed openings, and one circle segment-like recess of the center point opening are alternating.

Preferably, three groups of openings created in each case of two circularly formed openings and three circle segment-like recesses are formed. Preferably, it is provided for at least one imaginary circle line of the transverse disc to intersect both the circle segment-like recesses and the groups of openings created in each case of two circularly formed openings.

In a further embodiment of the invention, the openings may also have a rhombus shape and/or a polygon shape and/or a pointed arc shape and/or a triangle or square shape having at least partially bent sides.

Between the single openings of the transverse disc, the material of the transverse disc is formed. This material preferably is created of metal.

In a possible embodiment of the invention, the openings have such a size and are arranged with respect to one another such that the material of the transverse disc is formed in a strut-like manner. The struts can be formed in a straight and/or curved shape. When struts are formed, a particularly advantageous relationship of opening sizes in relation to the remaining material of the transverse disc is created.

A further aspect of the invention is related to a solid bowl screw centrifuge, which has at least one transverse disc according to the invention. The transverse disc according to the invention is formed in the interior of the screw hub.

A preferred subordinate aspect of the invention is related to a solid bowl screw centrifuge having a centrifuge screw, which comprises at least in some sections a screw hub created of longitudinal bars. According to the invention, at least one transverse disc according to the invention is arranged within the screw hub.

It is possible for several transverse discs according to the invention to be arranged within the screw hub. Furthermore, it is possible for the transverse discs arranged within a screw hub to be differently formed. It is possible for at least one of the formed transverse discs to be a transverse disc according to the invention, whereas the further transverse disc(s) has/have another formation.

In a particularly preferred embodiment of the invention, the transverse disc forms an axial passage for a centrate produced within the solid bowl screw centrifuge independently of the pond depth formed within the drum of the solid bowl screw centrifuge.

In other words, by means of the solid bowl screw centrifuge having a transverse disc according to the invention, it is effectively avoided that the solid matter is accumulated within the drum such that the openings or recesses formed as a standard at the transverse disc circumference are clogged with solid matter.

The liquid/centrate may rather freely flow off due to the transverse disc according to the invention being formed. According to the invention, an axial passage for the liquid/centrate is enabled at any pond depth without the centrifuge screw, in particular the screw created of longitudinal bars, losing stability.

The solid bowl screw centrifuge according to the invention may be both a 2-phase solid bowl screw centrifuge and a 3-phase solid bowl screw centrifuge.

Hereinafter, an exemplary embodiment of the solution according to the invention will be explained in more detail on the basis of attached schematical drawings.

Figure 2:
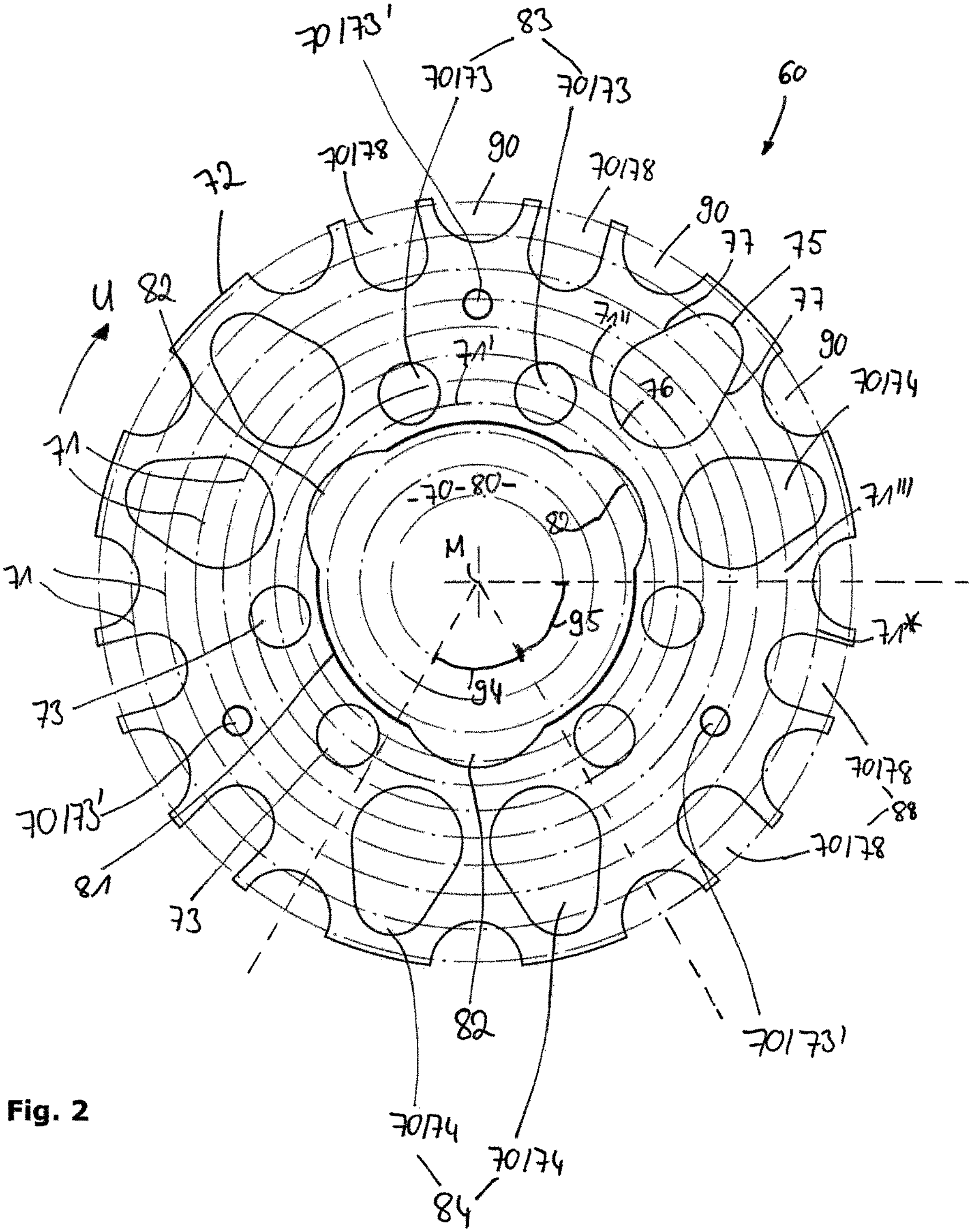

Shown are in:

FIG. 1 a longitudinal cut of a solid bowl screw centrifuge according to the invention having at least one transverse disc according to the invention; and FIG. 2 a representation of a transverse disc according to the invention.

In the following, the same reference numerals will be used for identical parts or parts of identical action.

In FIG. 1, a solid bowl screw centrifuge 10 is represented, which extends substantially along a horizontal longitudinal axis 12. The solid bowl screw centrifuge 10 has an outer housing 14, in which a drum 16 is mounted to be rotational about the longitudinal axis 12. By rotating the drum 16 at high rotational speed, a centrifugal force can be produced within it, by means of which a product to be clarified can be separated into a heavy phase and a light phase. For this purpose, the drum 16 is supported at a first drum bearing 18 and a second drum bearing 20. The represented solid bowl screw centrifuge 10 is a 2-phase solid bowl screw centrifuge. The transverse disc according to the invention, however, can also be realized in a 3-phase solid bowl screw centrifuge.

At the drum 16, an inlet 22 for the product to be clarified and an outlet 24 for the heavy phase and an outlet 26 for the light phase are formed. For rotating the drum 16, a drive 28 is provided. The outlet 26 acts as an overflow for the light phase located radially inside the drum 16, so that the light phase exits there autonomously, if a predetermined level, the so-called pond depth 52, is reached within the drum 16.

So that the heavy phase located radially outside within the drum can be discharged from the drum 16, a centrifuge screw 30 is provided within the drum 16. The centrifuge screw 30 is rotated relative to the drum 16 by means of the drive 28. Thereby, the material of the heavy phase is discharged to radially inside and thus to the outlet 24 along a cone formed at the drum 16.

For this purpose, the centrifuge screw 30 is configured having a screw hub 32 extending longitudinally to the longitudinal axis 12, which screw hub is surrounded radially outside by a screw spiral coil 34. The screw hub 32 consequently serves the purpose of supporting the screw spiral coil 34 in the radial direction, of transmitting a torque from the drive 28 to the screw spiral coil 34, and of receiving in particular tensile forces and thrust forces in this case. The screw hub 32 is configured by a grid structure 56 in the cylindrical longitudinal section 36.

The grid structure 56 is configured by means of twelve longitudinal bars 58, which are evenly distributed at uniform distances across the circumference of the screw hub 32 in the longitudinal direction thereof, thus in parallel to the longitudinal axis 12.

The preferred number of longitudinal bars 58 is between 8 and 16, in particular between 10 and 14. Radially outside, the longitudinal bars 58 each create a contact surface for the screw spiral coil 34 and are supported radially inside on transverse discs 60. The longitudinal bars 58 extend in this case beyond the transverse discs 60, which are oriented transversely to the longitudinal axis 12 and thus create an inner support for the longitudinal bars 58.

Between two and six oblique struts 64 extend in each case between two transverse discs 60.

Within the conical longitudinal section 38, a screw hub 32 having a shell surface 44 is formed. The shell surface 44 is substantially closed and in particular configured by means of a sheet metal or a tube surface. The centrifuge screw 30 is mounted to be rotatable by means of a first screw bearing 40 and a second screw bearing 42.

The inlet region 48 is in particular defined by the inlet tube 46. The inlet tube 46 serves for supplying the product to be clarified centrally within the inlet region 48 into the interior of the screw hub 32. Due to the screw hub 32 created of longitudinal bars 58, the solid bowl screw centrifuge 10 has a large pond depth 52.

In FIG. 2, a transverse disc 60 according to the invention is represented in an enlarged manner.

It can be recognized that a plurality of openings 70 is formed within the transverse disc 60. These openings 70 have different geometries, cross-sections and arrangement patterns. The openings are arranged in such a manner, are formed with respect to the geometry in such a manner, and have such opening sizes that on at least 75% of all of the imaginary circle lines 71 of the transverse disc 60 from the center point M to the transverse disc circumference 72 at least one opening 70 or a section of an opening 70 is formed at least in some sections.

In other words, the transverse disc 60 enables an axial passage of the centrate due to the openings 70 formed at each pond depth 52 prevailing within the solid bowl screw centrifuge 10. At the same time, the stability of the transverse disc 60 and thus of the screw hub 32 or the centrifuge screw 30 is not negatively affected.

First, an opening 70/80 formed in the center point M of the transverse disc 60 can be recognized. This opening 80 has a circular form 81 with additionally further circle segment-like recesses 82. In the present case, three circle segment-like recesses 82 are formed. The circle segment-like recesses are evenly distributed over the circumference of the circular form 81. In other words, the circle segment-like recesses 82 each are arranged at an angle of 120° relative to one another.

Starting from the center point M in the radial direction, furthermore openings 70 are arranged, which are formed as circular openings 73. As compared to all of the other openings 70 of the transverse disc 60, these openings 73 have the smallest opening size.

It can be recognized that these circular openings 73 each are arranged in pairs. Two circular openings 73 create a group of openings 83 in each case. Six circular openings 73, and thus three groups of openings 83 are formed.

The groups of openings 83 in turn are evenly arranged in the circular arc direction on the transverse disc 60. In other words, the groups of openings 83 are in turn arranged at an angle of 120° relative to one another. It can be recognized that the groups of openings 83 are arranged in relation to the center point opening 80 such that a group of openings 83 is in each case arranged between two circle segment-like recesses 82. In other words, the groups of openings 83 are in turn arranged at an angle of 120° relative to one another. It can be recognized that in some sections the openings 73 as well as the circle segment-like recesses 82 of the opening 80 are formed at the exemplary circle line 71'.

Additionally, three circular openings 73' are formed. The openings 73' have a smaller diameter than the circular openings 73. The three circular openings 73' each are formed to lie radially inside a recess 90. Moreover, the circular openings 73' are formed in a radial extension to the central distance of the circular openings 73 of the groups of openings 83.

The transverse disc furthermore has openings 70 formed in a cam-shape. These cam-shaped openings 74 in turn are arranged in pairs.

It can be recognized that six cam-shaped openings 74 are formed, wherein three groups of openings 84 are formed in total with respect to the cam-shaped openings 74. As cam-shaped openings 74, such an opening is to be understood, which has the shape of a cam of a camshaft in a top view of the opening 74. It can be recognized that the shape of the openings 74 corresponds to the shape of a steep cam. In order to be able to create such a cam-shaped opening 74, the openings have two circle segments, namely the first circle segment 75 and the second circle segment 76. The second circle segment 76 is in this case larger and has a larger radius than the first circle segment 75.

The two circle segments 75 and 76 are connected to one another by means of a straight connecting line 77, so that the cam-shape of the openings 74 is created. It can be recognized that all of the cam-shaped openings 74 are arranged such that the smaller circle segments or the smaller arc segments 75 each point in the direction of the transverse disc circumference 72, and the second circle segments or the larger arc segments 76 point to the inside in the direction of the center point M.

The groups of openings 84 are arranged in such a manner that a group of openings 84 and a group of openings 83 are in each case arranged alternatingly in the circumferential direction U. It can be recognized by means of the exemplary circle line 71" that both the circular openings 73 and the cam-shaped openings 74 are partially formed on this circle line 71".

The transverse disc moreover has openings 70 formed as U-shaped recesses 78. Six of such U-shaped recesses 78 are formed in total on the transverse disc 60.

Two of these recesses 78 are each arranged in pairs and create a group of openings 88. In total, three groups of openings 88 are thus formed, which in turn are arranged to be evenly distributed over the transverse disc 60. The groups of openings 88 each are arranged at 120° relative to one another.

It can be recognized by means of the exemplary circle lines 71'" and 71* that at these circle lines 71'" and 71* both the cam-shaped openings 74 and the U-shaped openings 78 are formed at least in some sections.

The transverse disc 60 furthermore has recesses 90 at the transverse disc circumference 72. These recesses are substantially formed to be semicircular. The recesses 90 serve in particular for receiving and fixing longitudinal bars 58 of a screw hub 32.

In the present case, twelve of such recesses 90 are formed. Accordingly, it is possible for a screw hub 32 to be created of twelve longitudinal bars 58. It is not necessary, however, to receive a longitudinal bar in all of the recesses 90. In other words, when less than twelve longitudinal bars are present, each second recess 90 may be left free, for example.

The transverse disc 60 is created of alternatingly arranged circle sectors 94 and 95.

A first circle sector 94 comprises a circle segment-like recess 82 and a group of openings 84 formed of cam-shaped openings 74. A second circle sector 95 comprises a group of openings 83 formed of circular openings 73, and a group of openings 88 formed of U-shaped recesses 78. Furthermore, a circular opening 73' is respectively formed in the second circle sector 95.

The circle sectors 94 and 95 are alternatingly arranged to one another in the circumferential direction U. In total, three first circle sectors 94 and three second circle sectors 95 are formed.

Due to the differently formed openings, 70 or 73, 74, 78 and 80, an axial passage for centrate produced within the solid bowl screw centrifuge 10 is enabled to be formed independent of the pond depth 52 formed within the drum 16 of the solid bowl screw centrifuge 10.

LIST OF REFERENCE NUMERALS

10 solid bowl screw centrifuge
12 longitudinal axis
14 outer housing
16 drum
18 first drum bearing
20 second drum bearing
22 inlet for the product to be clarified
24 outlet for the heavy phase

26 outlet for the light phase
28 drive
30 centrifuge screw
32 screw hub
34 screw spiral coil
36 cylindrical longitudinal section
38 conical section
40 first screw bearing
42 second screw bearing
44 closed shell surface
46 inlet tube
48 inlet region
52 pond depth
56 grid structure
58 longitudinal bar
60 transverse disc
64 oblique strut
70 opening
71, 71', 71'', 72''', 71* circle line
72 transverse disc circumference
73, 73' circular opening
74 cam-shaped opening
75 first circle segment
76 second circle segment
77 straight connecting line
78 U-shaped recess
80 opening of center point
81 circular form
82 circle segment-like recess
83 group of openings
84 group of openings
88 group of openings
90 recess
94 first circle sector
95 second circle sector
M center point
U circumferential direction

The invention claimed is:

1. A solid bowl screw centrifuge (10) with a centrifuge screw (30), comprising a screw hub (32) created of longitudinal bars (58) at least in some sections, wherein at least one transverse disc (60) is arranged within the screw hub (32) for stabilizing a screw hub structure (56), characterized in that at least one opening (70) is formed, at least in some sections, on at least 75% of all the imaginary circle lines (71) of the transverse disc (60) between the center point (M) and the transverse disc circumference (72), wherein recesses (90), which are arranged evenly distributed, are formed at the transverse disc circumference (72), whereby the recesses (90) serve to receive the longitudinal bars (58), wherein the at least one opening (70) includes one or more openings that are formed at least in some sections on all of the imaginary circle lines (71) of the transverse disc (60) and wherein independent of the pond depth (52) formed within the drum (16) of the solid bowl screw centrifuge (10), the transverse disc (60) forms across the entire diameter area of the transverse disc an axial passage for a centrate produced within the solid bowl screw centrifuge (10).

2. The solid bowl screw centrifuge (10) according to claim 1, characterized in that the at least one opening (70) includes several openings, wherein the several openings (70, 73, 75, 78, 80) have different geometries and/or opening sizes and/or arrangement patterns.

3. The solid bowl screw centrifuge (10) according to claim 1, characterized in that the at least one opening (70) includes several openings (74) that are formed in a cam-shape or an oval-shape or elliptically.

4. The solid bowl screw centrifuge (10) according to claim 3, characterized in that, the several openings (74) are arranged in pairs.

5. The solid bowl screw centrifuge (10) according to claim 1, characterized in that the at least one opening (70) includes several openings (73) that are circularly formed.

6. The solid bowl screw centrifuge (10) according to claim 1, characterized by the at least one opening (70) includes an opening (80) formed in the center point (M) of the transverse disc (60) having a circular shape (81) with additional further circle segment-like recesses (82).

7. The solid bowl screw centrifuge (10) according to claim 1, wherein the recesses (90) are substantially semi-circular.

8. The solid bowl screw centrifuge (10) according to claim 5, characterized in that the several openings (73) are arranged in pairs.

9. The solid bowl screw centrifuge (10) according to claim 6, wherein the additional further circle segment-like recesses (82) include three circle segment-like recesses (82).

* * * * *